July 24, 1962 P. R. CHAPMAN ET AL 3,045,471
METHOD AND APPARATUS FOR TESTING LUBRICANTS
Filed Aug. 28, 1958 7 Sheets-Sheet 1

INVENTORS.
PAUL R. CHAPMAN
JOHN O. SCHIMMEL
ROBERT G. MOYER
BY Edward H. Jang
ATTORNEY

United States Patent Office 3,045,471
Patented July 24, 1962

3,045,471
METHOD AND APPARATUS FOR TESTING LUBRICANTS
Paul R. Chapman, John O. Schimmel, and Robert G. Moyer, Crystal Lake, Ill., assignors to The Pure Oil Company, Chicago, Ill., a corporation of Ohio
Filed Aug. 28, 1958, Ser. No. 757,856
11 Claims. (Cl. 73—10)

This invention relates to a method and apparatus for determining the performance characteristics of lubricants such as gear oils and other lubricants designed to prevent wear between moving metal parts of machinery. More particularly, this invention relates to discovery that by modifying a known method and apparatus for testing lubricants regarding: (1) the exact point at which the temperature measurements are taken, (2) the application of continuously increasing load instead of intermittently increasing load, and (3) preventing the loss of lubricant sample, there results an unusual and unexpected magnification of the load-temperature relationship whereby oils having utility in high-speed applications can be clearly identified and their peak performance observed accurately, and also oils having use in high-torque applications can be clearly identified and their peak performance observed with the same accuracy.

The method and apparatus to which this invention applies is known as the Shell four ball E.P. tester or the four-ball wear tester, as described in the Lubrication Engineers Manual. The prior art use of this apparatus has not recognized that the point of temperature measurement within the ball pot is critical to the attainment of certain valuable information not hitherto attainable. Also, in the four-ball wear test, loading of the lever arm connected to the machine has been intermittent, that is, by the manual addition of incremental weights thereto in loading ranges of 0.1 to 50.0 kg. Similarly, the E.P. tests generally involve incremental increases in load between sequential test runs on a particular lubricant. Generally, a series of ten-second runs is made at preselected loads of from 20 to 600 kg. on the E.P. Tester. The first run is made with a load of 40 kg. and is used as the base. Subsequent runs are made at successively higher loads until welding of the four balls occurs. Two check runs at the welding load are made and if welding does not occur in both of the check runs, the next higher load is applied until welding occurs. If welding does not occur, the three lower balls are retained stationary in the holder and two measurements are made of the wear spots on each of the three lower balls, one horizontally and the other vertically. The arithmetic mean of six measurements is obtained. The Hertz line diameter is calculated and applied to obtain the corrected load. The extreme pressure value equals the total corrected loads divided by the number (15 minimum) of progressive runs.

In the four ball wear tester the procedure is similar except that a friction indicator is used along with means for measuring the scar diameter. The coefficient of friction is determined by measuring (1) the force acting on the torque arm in grams, (2) the vertically applied load, (3) the length of the torque arm, and (4) the diameter of the balls. A 10 ml. sample of lubricant is placed in the sample pot surrounding the balls. The top ball is rotated at speeds of 1800, 1200 or 600 r.p.m. A temperature controller is used in conjunction with electric heaters to simulate operating conditions of from 86 to 465° F. The coefficient of friction is taken after the first minute of operation and the wear reading after one hour. The present invention constitutes an improvement in the mechanism and functioning of these prior devices.

Accordingly, a primary object of this invention is to provide a method of evaluating lubricating oil compositions, the results of which are correlatable with field performance, and are useful in predicting field performance.

Another object of the invention is to provide a method of evaluating lubricating oil compositions to obtain the load-temperature characteristics thereof which are correlatable with the result of other performance tests.

Another object of the invention is to provide a method of testing lubricating oil compositions to determine their extreme pressure properties in relation to their high-speed and/or high-torque performance characteristics as a means of predicting their actual field performance characteristics.

A still further object of the invention is to provide an apparatus for determining a load-temperature relationship which is correlatable with field performance of a test lubricant.

Still a further object of the invention is to provide a modified Four-Ball E.P. testing device incorporating one or more of the improvements including, (1) means for applying continuously increasing load, (2) precise location of a thermocouple in the ball pot to obtain correlatable temperature measurements, and (3) means for preventing the loss of lubricant from the ball pot.

Another object of this invention is to provide a method and apparatus for testing extreme pressure lubricants wherein load-temperature measurements are recorded over periods of continuous loading, while temperature measurements are made at the point of maximum lubricant temperature with least fluctuation and means or steps are provided to record and translate these measurements into realistic indicia of the high speed and/or high-torque performance of the lubricant.

These and other objects of the invention will be described or become apparent as the invention is developed.

Since the details of these test procedures are well known in the art, no further explanation is deemed necessary and the invention will be described in relation to the attached drawings wherein.

The invention is best developed by describing one form of apparatus in detail, and the results obtainable by use of the apparatus in evaluating various lubricating compositions and correlating the physical, chemical, laboratory and field test properties of the compositions and their component parts with the load-temperature curves of these compositions.

THE APPARATUS

Figures 1, 2, 3:
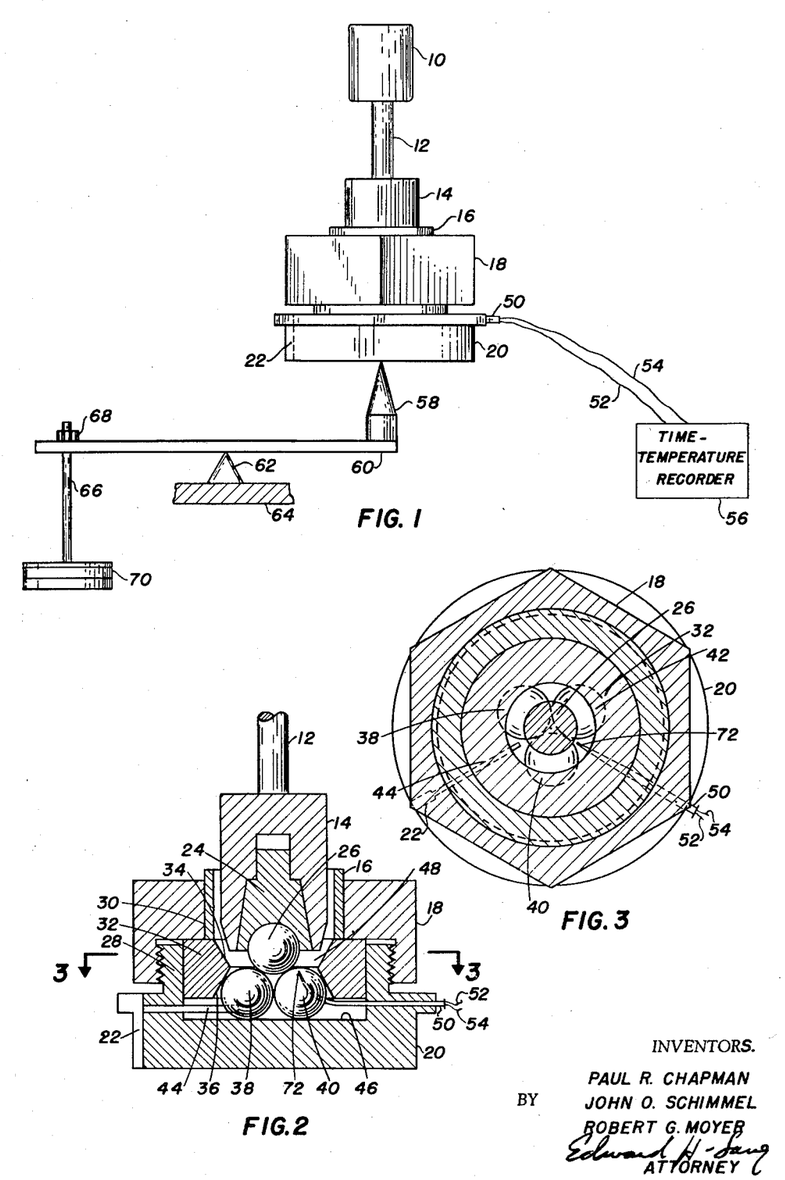
FIGURE 1 is a schematic view in partial section showing the ball pot assembly of a Precision-Shell four ball extreme pressure tester showing the location of the thermocouple of this invention in relation to the other parts.
FIGURE 2 is a vertical section of the ball pot assembly shown in FIGURE 1.
FIGURE 3 is a cross-sectional view taken along lines 3–3 of FIGURE 2.

Referring to FIGURES 1, 2 and 3, there are shown, in semi-diagrammatic and cross-sectional detail, the modifications in the four ball test machine that have been made in accordance with this invention. FIGURE 1 is a side view of the apparatus, omitting the ball pot holder and other accessory parts, such as the table, weight rack, etc., as are known in the art, and showing the relationship of motor 10, connected to drive shaft 12, carrying chuck assembly 14, splash ring 16, clamp nut 18 and ball pot 20. Notch 22 is for the purpose of matching a pin in ball pot holder (not shown) to hold the assembly in position. Chuck 14 has adapter 24 for the purpose of grasping rotating ball 26 so that it rotates with shaft 12 as driven by motor 10.

Ball pot 20 has threaded shoulder 28 which engages the internal threads of clamp nut 18. Internal shoulder 30 of clamp nut 18 is thereby pressed against ball retainer ring 32 having opposed frustro-conical surfaces 34 and 36 forming a cage for stationary balls 38, 40 and 42. Ball 42 is not shown in FIGURE 2. Ball-positioning pin 44 extends through shoulder 28 of ball pot 20 at a point above the bottom 46 so as to engage the surface of one of the stationary balls, as ball 40 (FIGURE 3). Bottom 46 may be provided with recesses into which balls 38, 40 and 42 fit to aid in holding same stationary in non-rotating position. Special ball retainers may also be used.

Splash ring 16 fits within clamp nut 18 and is held frictionally by shoulder 30. The inner circumferential surface of splash ring 16 and the space defined by surfaces 34 and 36, with the bottom of the chuck 14 and adapter 24, and bottom 46 of ball-pot 20, form a lubricant-containing space identified as 48. Splash ring 16 has been found necessary to prevent loss of lubricant from space 48 when the machine is in operation. Surface 36 impinges on balls 38, 40 and 42, preventing ball retainer ring 32 from resting on bottom 46, thus providing space for the entry of ball-positioning pin 44 and thermocouple 50 with electrical leads 52 and 54 connecting to time-temperature recorder 56.

This assembly is supported by point support 58 attached to lever arm or load lever 60, carried by a knife-edge 62 on platform 64. Bolt 66, held by nut 68, is attached to the other end of load lever 60 for the purpose of increasing the pressure of contact between the stationary balls 38, 40 and 42 and rotating ball 26 through the gradual and timed increase of weight 70. Chuck 14 has a beveled edge so that it clears splash ring 16 and surface 34 during rotation. Thermocouple 50, to be described in more detail, is sealed within ball pot 20 through a suitable conduit (not shown) so that no leakage of lubricant can take place. The hot junction of the thermocouple is indicated at 72.

Time-temperature recorder 56 may be an instrument suitable for recording automatically the signal from the thermocouple 50. Such an instrument is Minneapolis Honeywell Brown "Electronik" Strip Chart recorder, incorporating a pen and modified to include an automatic timer which produces a "blip" in the temperature curve at one minute intervals. Such an instrument is adapted to draw a continuous temperature curve with time references.

The position of hot junction 72 of thermocouple 50 in relation to the stationary balls 38, 40 and 42 is an important consideration in accordance with this invention. In fact, the point at which the temperature is measured, the application of practically continuous increases in loading and the prevention of oil loss from zone 48 cooperate to give the unusual results obtained in accordance with this invention. Continuous loading has not been previously applied or thought necessary in conjunction with the four ball tests, although it is applied in the Falex test. The splash ring is important because it has been found that the results obtained are not repeatable without it. And the thermocouple must be adjacent to one of the stationary balls on a side away from the direction of rotation of ball 26, within about 1/16" or less of one of the stationary balls and in a horizontal plane above the horizontal equatorial plane of the stationary balls but below the horizontal plane of the points of contact. Stated differently, the thermocouple hot juncture 72 is located: (1) at or slightly below the plane intersecting the contact points of the four balls, (2) in line with or higher than the equatorial plane of the lower or stationary balls, and (3) at a point within the stream of oil leaving the rubbing surface or areas of the balls by the action of centrifugal force.

Splash ring 16 is an ordinary cylindrical section of steel cut at a length such that it does not protrude appreciably above the top of nut 18. Splash ring 16 fits within shoulder 30 tight enough so that it is not thrown out by vibration or surges of lubricant in space 48, yet loose enough so that it can easily be removed for cleaning. The addition of the splash ring to the apparatus insures a satisfactory oil level throughout the duration of a test.

Various means are available for continuously increasing the load on rod 66. One arrangement may comprise a system whereby small shot weights can be continuously dropped in a pan at a constant rate. A calibrated spring may be fastened to rod 66 and gradually extended or placed under continuously increasing amounts of tension to apply continuously increasing loading to the ball pot. An electro-magnet may be used to operate on an iron core attached to rod 66 whereby gradual increase in the magnetic field pulls the core and rod at a continuously increasing amount. The continuous loading or packet-conveying means described in United States Patents 1,654,495, 1,007,261 and 2,679,950 may be used to apply uniform small incremental weights to rod 66. Other arrangements will become apparent to one skilled in the art for applying a continuous gradual and measured increase in load on rod 66 or its equivalent. Pin 44 is provided in the ball pot so as to insure that the balls will always be clamped in the same position in relation to the thermocouple.

THE TEST PROCEDURES AND METHODS

Extreme pressure lubricants such as gear oils are evaluated by such well known tests as API gravity, SUS viscosity, viscosity index, pour point, channel point, rust protection, copper strip stain, SAE machine at 1000 r.p.m. and at 500 r.p.m. (after heating), Timken test (800 r.p.m.), CRC-L-19 (high speed-low torque) test, CRC-L-20 (high torque-low speed) test, and CRC-L-22 storage stability. Other tests include the Timken Extreme Pressure test (CRC Designation EL-18-54), the CRC-L-12-445 foam test, and the CRC-L-37 combination high speed-high torque test, which are all known and described in the prior art. These bench test evaluations are used in the hope of obtaining a general indication of the performance to be expected of the lubricant under actual service conditions. However, more often than not, there can be found no correlation between the results obtained by bench or dynamometer tests and the field performance of a lubricant. Since both the dynamometer tests and field tests are expensive, it is highly desirable to have a simple and inexpensive test to obtain information which is useful in predicting field performance, and which is readily correlatable therewith. Furthermore, a test procedure is needed which qualitatively reflects the changes in lubricating characteristics of the test lubricant and demonstrates the effects of various chemicals, addends, etc. upon the lubricating characteristics of a finished oil. In addition, a test is needed which is much more sensitive to minor changes in composition than any other extreme pressure test available. The apparatus and test procedure of this invention meets these requirements and provides the chemist with an effective tool and inexpensive test to aid in the problem of selecting optimum amounts or proper balances of chemical additives in all fluid lubricants.

The new test procedure, which will be described subsequently in greater detail, comprises the following general steps:

(1) A measured quantity of lubricant is brought into contact with moving and stationary metal rubbing surfaces which are in direct contact, metal-to-metal.

(2) The movable metal surface is rotated at a constant speed.

(3) The temperature of the lubricant is measured continuously at a point which is, (a) Adjacent to one of the stationary rubbing surfaces on a side away from the direction of rotation of the moving surface;

(b) At a point within the stream of oil leaving the rubbing surface or areas by the action of centrifugal force;

(c) At or slightly below the plane intersecting the contact point of the four balls, and (d) In line with or higher than the equatorial line of the lower or stationary balls.

(4) A continuously increasing amount of load or pressure is applied between the rubbing surfaces.

(5) The volume of the lubricant is maintained substantially constant.

(6) A continuous record is made of the load and temperature variations until one of the following end points is reached:

(a) The load limit of the apparatus is reached, (b) Welding takes place between the rubbing surfaces, (c) A ball pot temperature of 400° F. is reached.

Data obtained using this procedure for a number of gear oil compositions revealed that, under the same test conditions, each composition had a unique temperature-load curve. The curves determined in a large number of tests varied in shape due to (1) sudden, great rises in temperature (as much as 200° F.), (2) rapid drops in temperature, and (3) other lesser phenomena. Further, it was found that the curve for a mineral oil without additives exhibits a temperature rise which is nearly proportional to the load. This leads to the conclusion that the coefficient of friction remains constant. From this it is concluded that any deviations from the mineral oil curve observed when testing compounded oils are the result of changes in the coefficient of friction. The observations of Bowden and Tabor in their book "The Friction and Lubrication of Solids" on how the coefficient of friction is affected by film strength, film thickness and chemical reactions on metallic surfaces are in part confirmed by the observations made with the modified four-ball machine and method of this invention. These concepts appear to apply in the interpretation of the data obtained by the present method; but, regardless of any theoretical considerations, the information obtained by our method has been found to be correlatable with field performance.

To illustrate, reference is made to FIGURES 4–9 which represent various load-temperature curves obtained by applying and altering the new test procedure.

Figure 4:
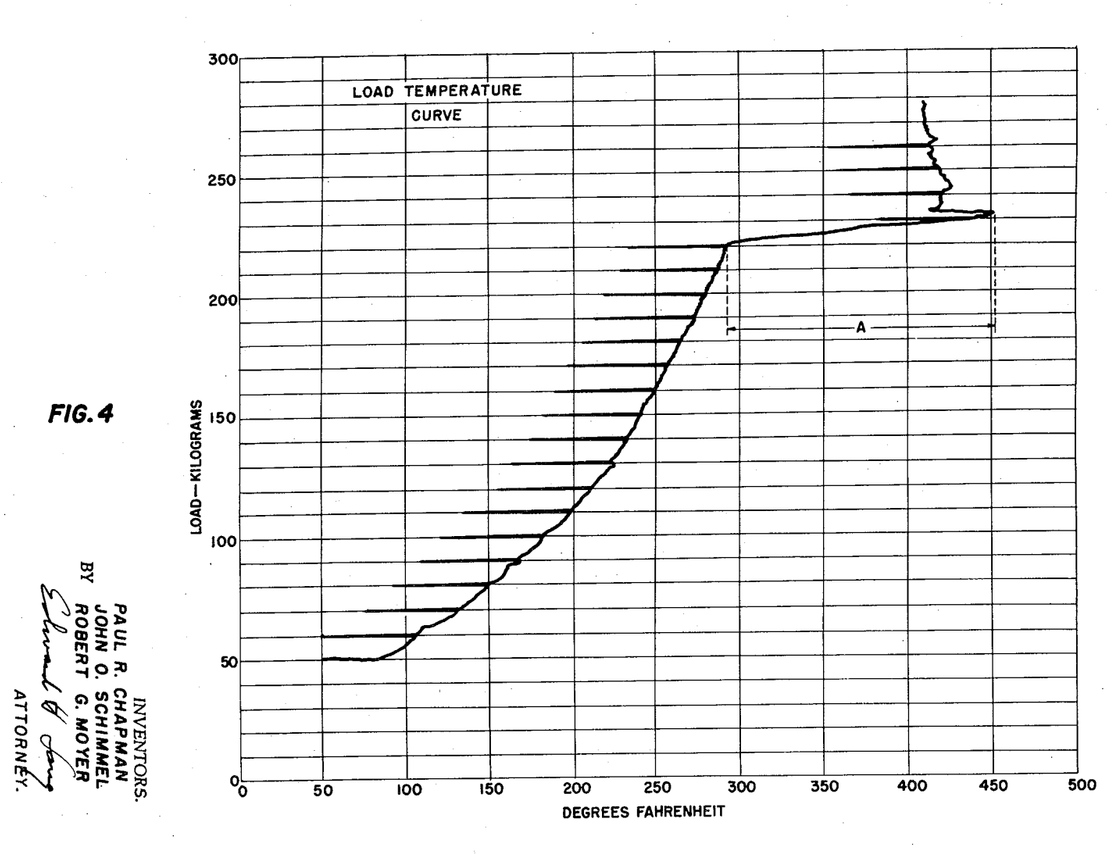
FIGURE 4 is a graph showing the type of temperature-load curve obtained when using the apparatus with the thermocouple placed as indicated in FIGURE 2.

FIGURE 4 is the load-temperature curve obtained by testing a gear oil composition which had previously passed the CRC-L-37, CRC-L-19 and CRC-L-20 dynamometer tests. This single curve is illustrative of the type of curve obtained with the critical thermocouple location of this invention as previously defined.

Figure 5:
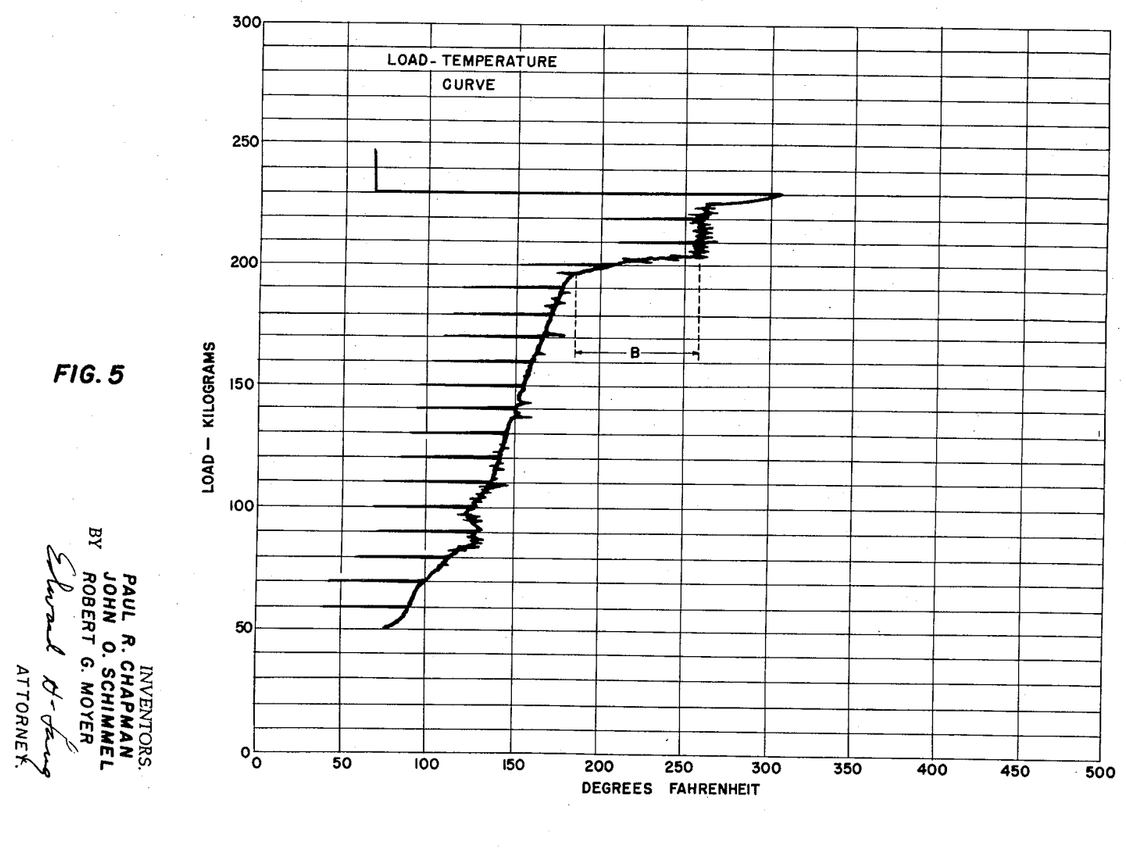
FIGURE 5 is a graph showing the type of load-temperature curve obtained when using the apparatus with the thermocouple located in the center of the ball pot.

FIGURE 5 is the load-temperature curve obtained by testing the identical gear oil composition tested in obtaining the curve in FIGURE 4 except that the thermocouple was in the center of the ball pot, that is, positioned in accordance with the best prior art practice. A comparison of the curves of FIGURES 4 and 5 reveals that the break-point A—A in the former is longer than the irregular break point B—B in FIGURE 5. Thus, the true temperature rise or point of increased friction is readily detectable in FIGURE 4, while it is relatively very obscure in FIGURE 5. Also, the curve in FIGURE 4 is much more regular and more easily read than the curve in FIGURE 5.

In order to further demonstrate the invention, tests were conducted on a number of extreme pressure lubricants and component parts of such lubricant compositions, as identified, along with dynamometer test results as indicated.

*Table I*

DYNAMOMETER TESTS OF GEAR OILS

| Blend and Curve No. | CRC-L-37 | Dynamometer Test CRC-L-19 | CRC-L-20 |
|---|---|---|---|
| 1 | fail | | |
| 2 | do | | |
| 3 | pass | | |
| 4 | do | | |
| 5 | (not run) | | |
| 6 | pass | | |
| 7 | | (E.P. base in mineral oil base) | |
| 8 | | (Fatty acid in mineral oil base) | |
| 9 | | (additive A in mineral oil base) | |
| 10 | | (mineral oil base alone) | |
| 11 | | (additive B in mineral oil base) | |
| 12 | pass | pass | pass. |
| 13 | fail | do | Do. |
| 14 | | do | Do. |
| 15 | | fail | Do. |
| 16 | | pass | fail. |

The dynamometer tests are described fully in the CRC Handbook prepared by The Coordinating Research Council, Inc. The blend numbers given in Table I correspond to the curve numbers in the FIGURES 6, 7 and 8.

Figure 6:
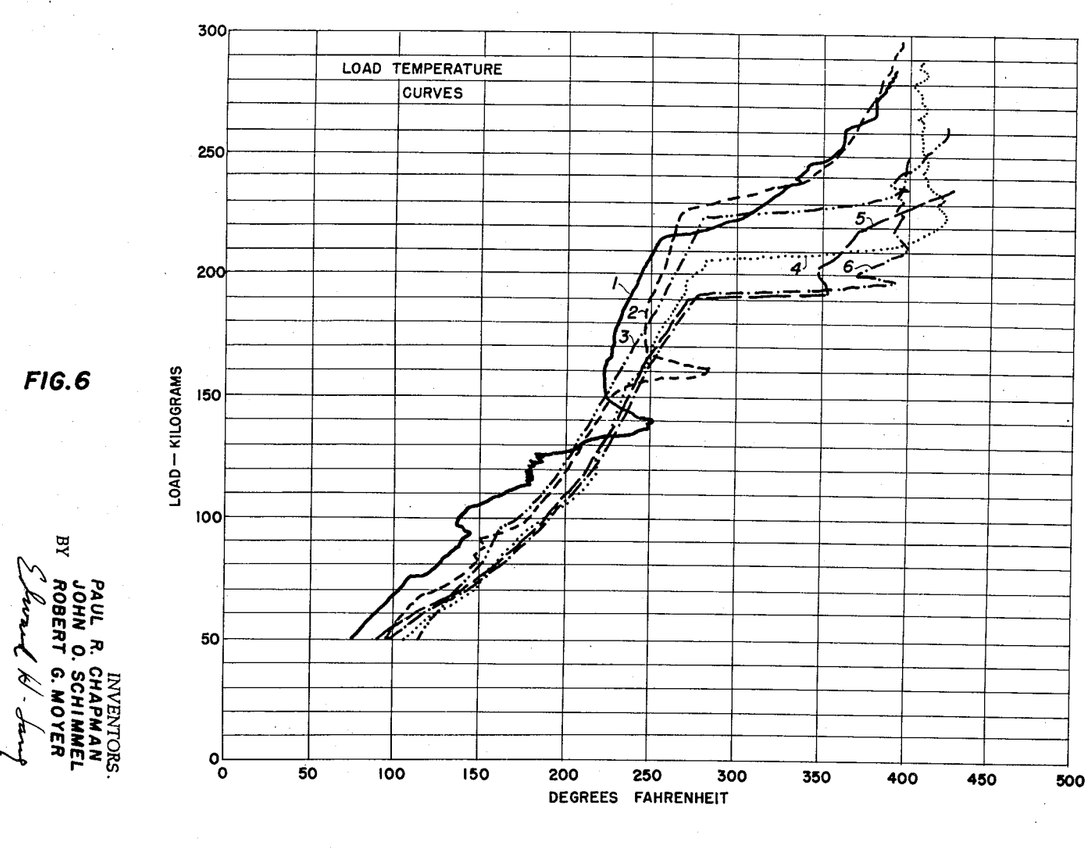
FIGURE 6 is a graph showing the type of load-temperature curves obtained in comparing various gear oil compositions which have also been evaluated as to high-speed, high-torque, and other performance characteristics.

Blends 1 through 5, inclusive, were prepared from five different sulfurized-phosphorized lard oil extreme pressure bases prepared under different processing conditions. Each blend contained substantially the same mineral oil base and substantially the same amount of the extreme pressure base. The difference in curves 1–5 are atributable only to minor variations in the processing technique used in preparing the sulfurized-phosphorized lard oil bases. With this type of information, showing the effect of processing conditions, studies can be made to assure closer conformance to critical processing conditions and the repeated production of superior lubricants.

Figure 7:
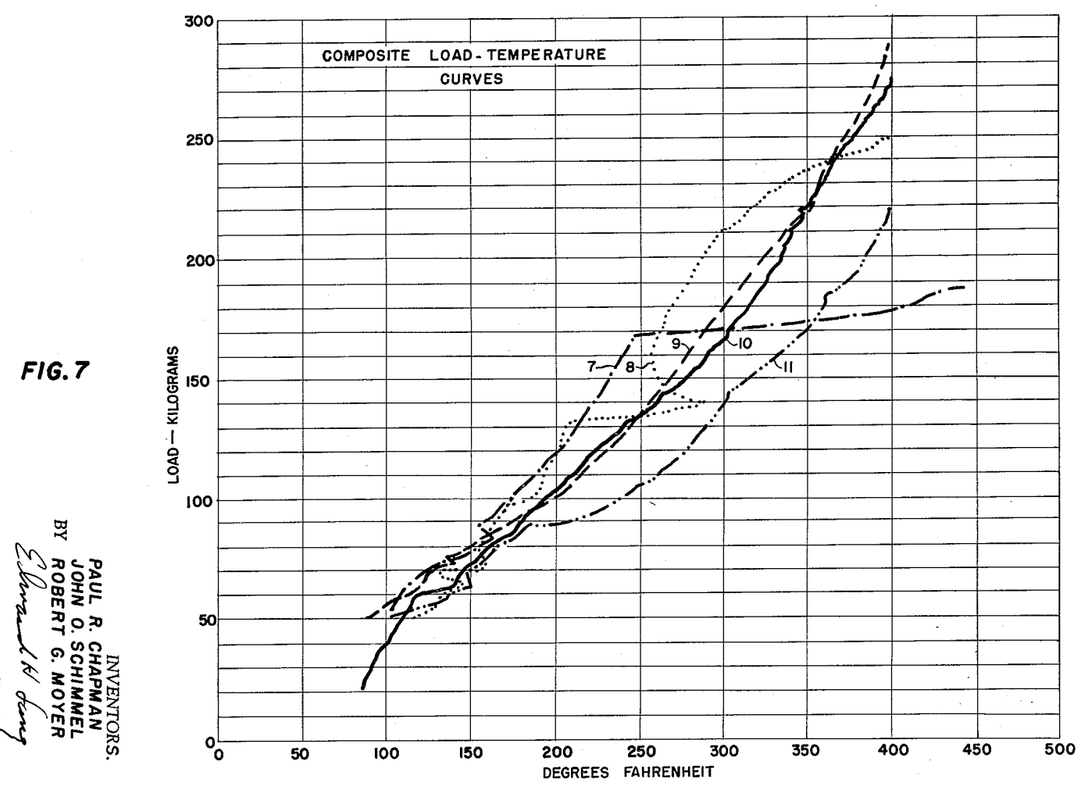
FIGURE 7 is a graph showing the types of load-temperature curves obtained in evaluating a lubricant and its component parts by the test procedure of this invention.

Curves 7–11 (for blends 7–11, respectively), shown in FIGURE 7, demonstrate the effect of each individual component of a gear oil composition on its load-temperature characteristics. Blend 10 is the mineral oil base with 0.05 part by weight of a mixture of polymethyl siloxanes used as a foam depressant. Blend 8 comprises the base oil of blend 10 with 10.00 parts by weight of a mixture of $C_{18}$ unsaturated fatty acids in approximately equal proportions. Blend 9 is the base mineral oil of blend 10 with 0.10 part by weight of a di-oleic acid salt of a fatty amine which is added as a solubilizing agent for extreme pressure bases. Blend 7 is essentially blend 9 with 13.67 parts by weight of an extreme pressure base comprising sulfurized-phosphorized fatty oil prepared in accordance with copending application Serial Number 553,419, filed December 16, 1955 by P. R. Chapman and A. Manteuffel now Patent 2,910,438. Blend 11 is essentially blend 9 with 1.33 parts by weight of an extreme pressure agent added. The curve of FIGURE 4 is the curve obtained for the total composition of the components of blends 7–11.

Figure 8:
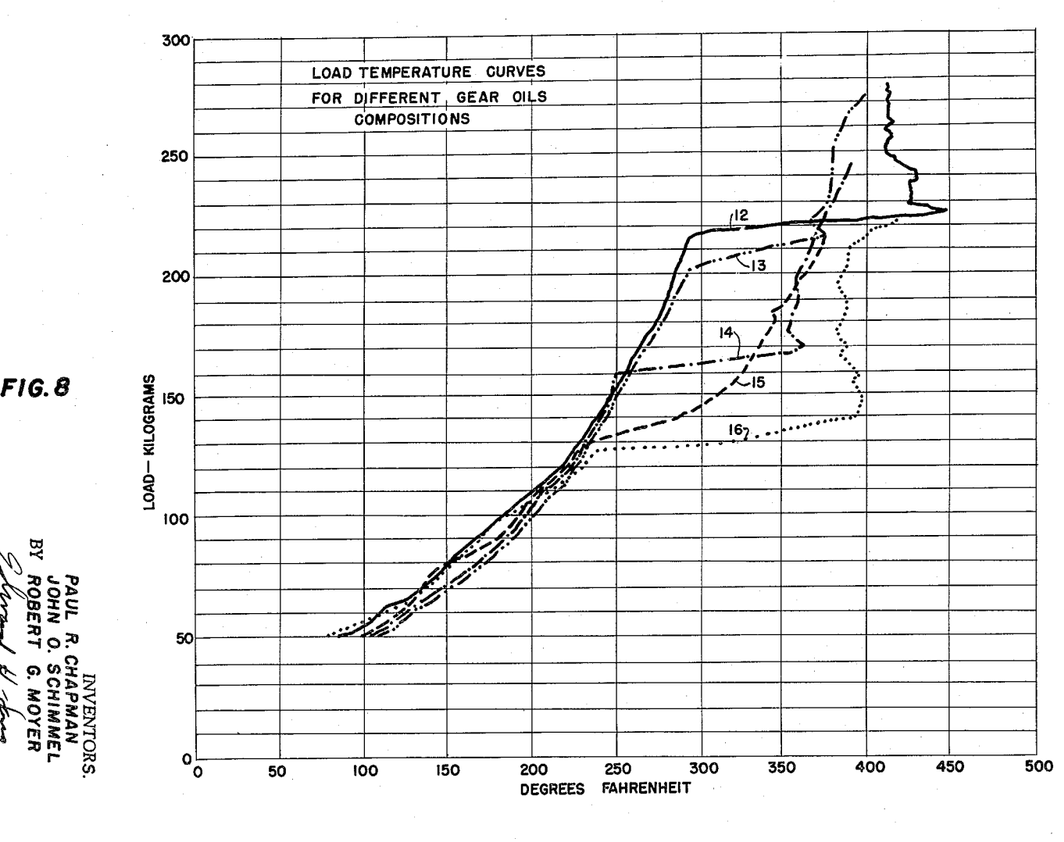
FIGURE 8 is a graph showing load-temperature curves for different gear oil compositions which have also been evaluated as to high-speed, high-torque and other performance characteristics.

FIGURE 8 shows the types of different curves obtained in testing various gear oils having slightly different compositions. Blend 12 is identical with the composition shown tested to form the curve of FIGURE 4. The field tests on this blend showed good general service performance and passage of severe road tests. Blends 13 and 14, although failing the combination high-speed, high-torque test, showed good general service but each failed in severe road tests. An overall rating of excellent could be given to blend 12, while a rating of fair would be given to blends 13 and 14. Blends 15 and 16 showed poor general service, failure in severe road tests, and were given a poor overall rating.

A comparison of blends 15 and 16 shows, however, the distinctly different and characteristic types of curves obtained for a blend which passes the high-torque test (blend 15) and the high-speed test (blend 16). These combined characteristics are shared in part by blends 13 and 14 and reach a maximum in blend 12 which passes all of the bench and field tests. The differences in the compositions of blends 12–16 lie in the type and amount of extreme pressure base, all having essentially the same mineral base oil composition and auxiliary addends, including oxidation inhibitors, foam depressants, detergents and sludge inhibitors.

Figure 9:
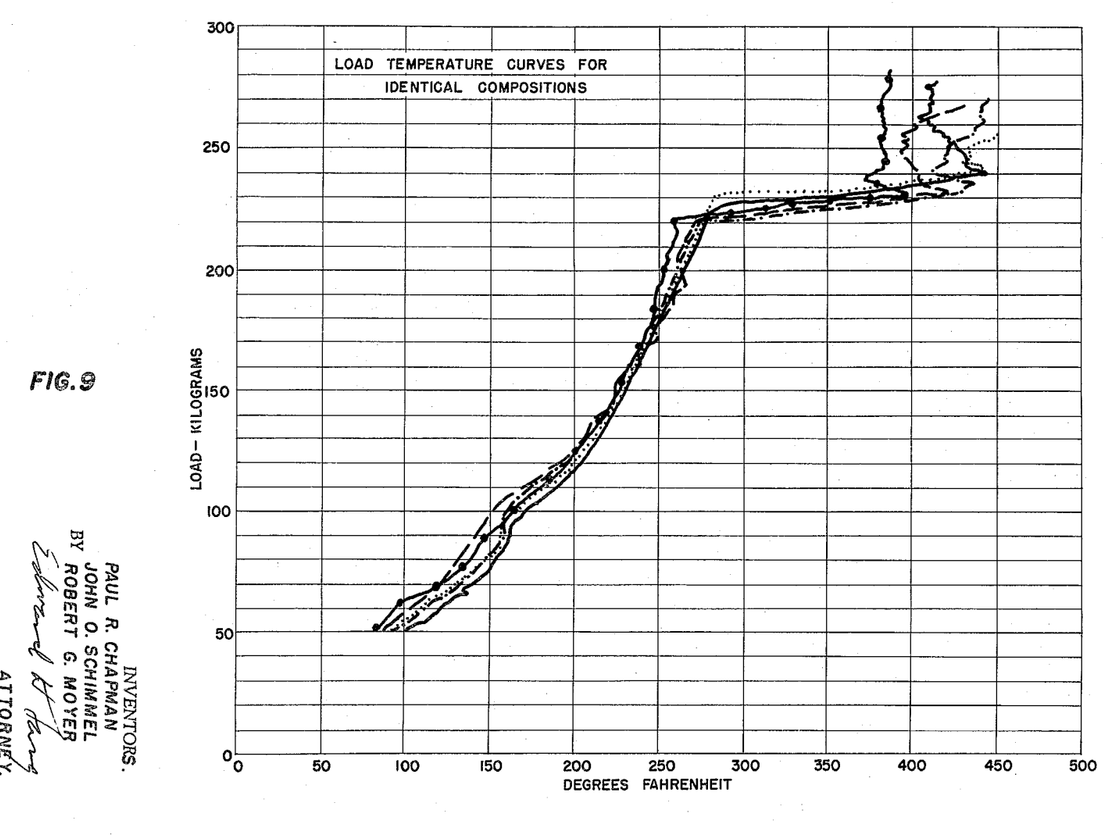
FIGURE 9 is a graph showing load-temperature curves obtained in five tests on a single composition, demonstrating the repeatability of results obtained using the apparatus of this invention.

FIGURE 9 shows the results obtained by running load-temperature tests on portions of the same gear oil blend (#12) five consecutive times. The closely conforming curves show the excellent repeatability of the test.

From the foregoing explanation of the results obtainable by practicing this invention, it is apparent that a correlation exists between the pattern of the load-temperature curves and the performance as measured by dynamometer tests and field tests. The device and method of this invention qualitatively reflects minute changes in the lubricating characteristics of a test oil composition and clearly demonstrates the effects of changes in composition, changes in base oil, changes in addends used, and the influence of each component on the functioning of a particular blend of test oil. Furthermore, the apparatus and test method has been demonstrated to be much more sensitive to changes in composition or processing procedures used in the manufacture of component addends than is experienced in using the standard bench and dynamometer tests. The device and test procedure is well adapted as a tool for evaluating synergistic effects between components of a gear oil composition or other lubricating oil compositions.

One such application of the invention is the determination of load-temperature curve data which is correlatable with, and useful in predicting the anti-squawk performance of various blends of production and experimental automatic transmission fluids. In evaluating some 26 different ATF compositions, it was found that each exhibited a major "breakpoint" somewhere in the curve and that almost without exception these "breakpoints" occurred in the range of 90 to 120 kilograms beam load and 160 to 200° F. temperature for those compositions exhibiting good anti-squawk properties. This work also indicated that the "breakpoints," such as A—A in FIGURE 4, tended to occur at lower temperatures and/or load in measurements made in a basic automatic transmission fluid composition after addition of materials with no anti-squawk or negative anti-squawk value. These findings demonstrate the usefulness of the procedure and apparatus of this invention in predicting the anti-squawk properties of experimental blends and the potential anti-squawk value of proposed anti-squawk addends.

The effects of variations in composition on field performance of an experimental lubricant can be predicted from the load-temperature curves obtained by this invention without the necessity of adding an expensive new piece of equipment to the laboratory. The modifications in the apparatus and test procedure are made with a minimum of cost in materials or labor. The test procedure itself is very easily carried out by one skilled in this art. The effects of the addition of each component to a formulation can be carefully evaluated. Different sulfurizing and/or phosphorizing periods of time in preparing E.P. bases show clearly defined levels of transition or "breakpoints" on the curves. As the sulfurizing time is increased, the curves take different shapes. The finished oils containing these sulfurized and/or phosphorized bases tend to run cooler as the processing time is increased.

In terms of chemical activity, the results obtainable herein tend to show that the longer the processing period, the less active the bases become.

Compositions which display high-speed characteristics (pass the CRC–L–19 test) exhibit sharp temperature rises of as much as 180° F. On the other hand, blends which display high-torque characteristics (pass the CRC–L–20 test) show gradual temperature rises of about 60° F. at the transition point. As used herein, the transition or breakpoint is intended to mean that point on the load-temperature curve where a major change in the pattern or shape of the curve begins.

Further correlations and predictions are also possible. Graphs of results obtained with oils that passed both the CRC–L–19 and CRC–L–20 test or the CRC–L–37 combination test show a sharp temperature rise of from 90° F. to 150° F. Also, these transition points are at loads from 30 to 90 kilograms higher than the load for either the high speed type oil or the high torque type oil. The data herein with respect to blend 12, in FIGURE 4, shows one other characteristic of an oil which exhibits both good high speed and high torque performance at the CRC–L–37 performance level; after the end of the sharp temperature rise, the temperature dropped considerably.

With respect to the testing of gear oil compositions containing sulfurized-phosphorized fatty oil extreme pressure concentrates, the following limits appear to apply based on the data herein presented:

(1) When the load-temperature curve has a transition point under 140 kg. load and under 250° F. temperature, and shows a rapid rise of 180° F. or more in temperature, the gear oil is likely to pass the CRC–L–19 dynamometer test but fail the CRC–L–20 test.

(2) When the load-temperature curve has a transition point at a load less than 140 kg. and a temperature lower than 250° F. and when the temperature rise is very gradual in comparison to the temperature rise of a CRC–L–19 curve, the oil is likely to pass the CRC–L–20 test but fail the CRC–L–19 test.

(3) When the load-temperature curve has a transition point over 140 kg. load and over 250° F. temperature, and the temperature rises rapidly for about 90° F. or more, the gear oil is likely to pass both the CRC–L–19 and CRC–L–20 tests. The oil is most likely to pass the tests if, at the conclusion of the rise, the temperature increase to the conclusion of the test is at about the same rate as the increase was before the transiton took place.

(4) When the load-temperature curve has a transition point over 180 kg. load at a temperature of over 250° F., shows a sharp temperature rise of about 150° F. (A—A on FIGURE 4), and when in addition, at the end of the rise the temperature drops about 40° F. after which the rate of temperature increase assumes about the same value it had before the transition took place, the test oil is expected to pass the CRC–L–37 test.

Similar correlations can be obtained and performance predictions made for other types of lubricating oil compositions including motor oils, cutting oils, automatic transmission fluids, spindle oils, paper machine oils and other similar lubricating compositions.

Having thus described the invention, it becomes apparent that various modifications may be applied without departing from the scope thereof. The method can be applied with incrementally increasing loading, for example, but the results obtained are not as uniform or precise as when a continuously increasing load is used. Also, the device may be operated without the splash ring, but, with many types of compositions, it has been found that prevention of the escape of lubricant from the ball pot leads to more uniform and repeatable results. The exact location of the hot junction of the thermocouple is critical to the proper execution of the method and performance of the apparatus. In fact, it was the effect of the location of the thermocouple and the necessity of its uniform placement in relation to the stationary balls which led to the discovery that the balls should also be held so that on each re-assembly of the apparatus consistent results were obtained. With consistent and accurate temperature recordation the significance of prevention of loss of lubricant sample and the effect of smooth, uniform increase in load were discovered.

Experience with the field performance of certain types of gear oils has indicated that the oils give excellent performance if used with "broken-in" gears. This experience may be reflected in the test procedure of this invention by a further modification wherein the four-ball E.P. tester is run at a predetermined load (safe from seizure) for one minute with the test lubricant, after which the load is increased uniformly and continuously at a rate of ten kilograms per minute. Since most replacement or refill lubricants sold, excluding factory-fill compositions, are used to lubricate "broken-in" bearing or metal parts, this procedure gives a realistic evaluation of the oil.

What is claimed is:

1. The method of testing the extreme pressure characteristics of a lubricant which comprises bringing a measured quantity of a lubricant sample into contact with metal-to-metal rubbing surfaces under constant rubbing conditions, continuously increasing the load on said rubbing surfaces while measuring the temperature of the lubricant sample adjacent one of said rubbing surfaces as the lubricant sample is thrown therefrom by centrifugal force, continuously recording the load and temperature variations until a load limit of the rubbing surfaces is reached, the temperature reaches about 400° F. or the rubbing surfaces weld to each other.

2. In an apparatus for testing lubricants including a ball pot assembly having stationary lower balls in contact with a rotatable upper ball, means for rotating said upper ball to form a stream of lubricant leaving each of said contact surfaces, and means for applying a continuously increasing load to the contacting surfaces of said balls, the improvement comprising means for detecting the temperature of said lubricant sample located adjacent one of the stationary balls on a side away from the direction of rotation of the rotating ball and at a point within the stream of lubricant leaving one of the rubbing surfaces of said balls.

3. In an apparatus for testing lubricants including a ball pot assembly having stationary lower balls in contact with a rotatable upper ball, means for rotating said upper ball, and means for applying a continuously increasing load to the contacting surfaces of said balls, the improvement comprising means for detecting the temperature of said lubricant sample located in close proximity to one on said stationary balls and in a horizontal plane above the horizontal equatorial plane of said stationary lower balls, and below the horizontal plane of said contacting surfaces.

4. In an apparatus for testing lubricants including a ball pot assembly having stationary lower balls in contact with a rotatable upper ball, means for rotating said upper ball, and means for applying a continuously increasing load to the contacting surfaces of said balls, the improvement comprising means for detecting the temperature of said lubricant sample located at a point within the stream of lubricant sample leaving the contact surfaces of adjacent balls by centrifugal force and below the horizontal plane of said contacting surfaces.

5. In an apparatus for testing lubricants including a ball pot assembly having stationary lower balls in contact with a rotatable upper ball forming contacting surfaces in a horizontal plane, means for rotating said upper ball, and means for applying a continuously increasing load to the contacting surfaces of said balls, the improvement comprising thermocouple means for detecting the temperature of said lubricant sample, the juncture of said thermocouple being located adjacent one of the stationary balls on a side away from the direction of rotation of the rotating ball and in the horizontal plane above the horizontal equatorial plane of said stationary lower balls and below the horizontal plane of said contacting surfaces.

6. In an apparatus for testing lubricants including a ball pot assembly having stationary lower balls in contact with a rotatable upper ball forming contacting surfaces in a horizontal plane, means for rotating said upper ball, means for applying a continuously increasing load to the contacting surfaces of said balls, the improvement comprising means for detecting the temperature of said lubricant sample located adjacent one of the stationary balls on a side away from the direction of rotation of the rotating ball and in a horizontal plane above the horizontal equatorial plane of said stationary lower balls and below the horizontal plane of said contacting surfaces and means connected to said temperature detecting means to give a continuous indication of the rate of change of temperature with said increased load.

7. In an apparatus for testing lubricants including a ball pot assembly having stationary lower balls in contact with a rotatable upper ball, means for rotating said upper ball to form a stream of lubricant leaving each of said contact surfaces, means for applying a continuous increasing load to said contact surfaces of said balls and open-top-cup means surrounding said balls to confine a test lubricant sample in contact therewith, the improvement comprising a splash ring inside said cup to extend the effective height of the sides thereof and means for detecting the temperature of said lubricant sample located within said stream of lubricant leaving one of said contact surfaces at a point adjacent one of the stationary balls on a side away from the direction of rotation of the rotating ball.

8. In an apparatus for testing lubricants including a ball pot assembly having stationary lower balls in contact with a rotatable upper ball, means for rotating said upper ball, means for applying a continuously increasing load to the contacting surfaces of said ball and open-top-cup means surrounding said balls to confine a test lubricant sample in contact therewith, the improvement comprising a splash ring inside said cup to extend the effective height of the sides thereof, means for detecting the temperature of said lubricant sample located within said stream of lubricant leaving one of said contact surfaces at a point adjacent one of the stationary balls on a side away from the direction of rotation of the rotating ball, and means connected to said temperature detecting means to give a continuous indication of the rate of change of temperature with said increased load.

9. The apparatus in accordance with claim 8 in which said temperature detecting means is located in close proximity to one of said stationary balls and in a horizontal plane above the horizontal equatorial plane of said stationary lower balls but below the horizontal plane of said contacting surfaces.

10. The method of testing the extreme pressure characteristics of a lubricant which comprises bringing a measured quantity of a lubricant sample into contact with a ball pot assembly having stationary lower balls and a rotating upper ball under constant rubbing conditions, continuously increasing the load on said rubbing surfaces while measuring the temperature of the lubricant sample at a point located adjacent one of the stationary balls on a side away from the direction of rotation of the rotating ball, continuously recording the load and temperature variations until a load limit of the rubbing metal surfaces is reached, the temperature reaches about 400° F. or the rubbing surfaces weld to each other.

11. The method of testing the extreme pressure characteristics of a lubricant which comprises bringing a measured quantity of a lubricant sample into contact with a ball pot assembly having stationary lower balls and a rotating upper ball rubbing surfaces under constant rubbing conditions, continuously increasing the load on said rubbing surfaces while measuring the temperature of the lubricant sample at a point in close proximity to one of said stationary balls and in a horizontal plane above the horizontal equatorial plane of said stationary lower balls but below the horizontal plane of said contacting surfaces, continuously recording the load and temperature variations until a load limit of the rubbing metal surfaces is reached, the temperature reaches about 400° F. or the rubbing surfaces weld to each other.

References Cited in the file of this patent

UNITED STATES PATENTS

| | | |
|---|---|---|
| 2,059,856 | Eastman et al. | Nov. 3, 1936 |
| 2,234,228 | Boccasile | Mar. 11, 1941 |
| 2,370,606 | Morgan et al. | Feb. 27, 1945 |